United States Patent
Burnside, III et al.

[15] 3,661,439
[45] May 9, 1972

[54] TELESCOPIC KALEIDOSCOPE

[72] Inventors: John L. Burnside, III; Henry Hay, both of P. O. Box 8, San Juan Pueblo, N. Mex. 87566

[22] Filed: Oct. 30, 1970

[21] Appl. No.: 85,375

[52] U.S. Cl. ..................................................350/4, 353/1
[51] Int. Cl. .......................................................G02b 27/08
[58] Field of Search..............................350/4; 353/1; 355/18

[56] References Cited

UNITED STATES PATENTS 3,113,484   12/1963   Baker..................................355/18 X
3,160,056   12/1964   Taylor..................................353/1 X
R26,031     5/1966    Burnside..............................353/1 X Primary Examiner—Samuel S. Matthews
Assistant Examiner—Michael D. Harris
Attorney—Fulwider, Patton, Rieber, Lee & Utecht

[57] ABSTRACT

A telescopic kaleidoscope having a converging lens positioned between the objective lens and the front ends of the mirrors. The converging lens focuses the objective lens centrally on the plane of the rear ends of the mirrors to provide substantially equal illumination of the kaleidoscope image array. The array can be projected onto a screen by a projection lens and the kaleidoscope can be used as an attachment for a camera or a projector.

24 Claims, 5 Drawing Figures

INVENTORS
JOHN L. BURNSIDE III
HENRY HAY
BY Fulwider, Patton, Rieber
Lee, and Utecht
ATTORNEYS 3,661,439

TELESCOPIC KALEIDOSCOPE

BACKGROUND OF THE INVENTION

This invention relates to kaleidoscopes, and more particularly, to a new and improved telescopic kaleidoscope which can be used with cameras, projectors and the like.

Telescopic kaleidoscopes have been used as amusement devices and as sources of entertainment. Typically, such kaleidoscopes employ an objective lens which is spaced forwardly from a pair of intersecting mirrors having reflecting inner surfaces disposed in a "V" shape configuration so that the mirrors will reflect an image of a distant object formed at the front ends of the mirrors by the objective lens and enable an observer looking through the rear ends to see a radially symmetrical array of images of the object.

As amusement devices, telescopic kaleidoscopes have met with great success. When used as a hand-held device to be viewed directly by an observer's eye, present kaleidoscopes seem to be quite acceptable as producing bright and symmetrical image arrays. Upon close examination of the array, however, several defects in the array become apparent.

One such defect is that of unequal brightness of the various segments forming the array. It has been found that if telescopic kaleidoscopes are attached to cameras, the resulting pictures will have portions of the image array overexposed and other portions underexposed. This is attributable to the fact that the light rays forming some segments of the array undergo more numerous reflections between the mirrors, and hence travel greater distances, than the light rays forming other segments.

It is well known that light diverging from a point source diminishes in intensity with increasing distance of travel, and further, because of the increasing divergence of the light rays, that some light is lost with each reflection by the mirrors. For these reasons, it has traditionally been thought that unequal illumination of the various segments of the image array was inherent in all telescopic kaleidoscopes and was unavoidable.

While attempts have been made at overcoming this defect, none have proved successful. One such attempt has been to incline the principal axis of the objective lens relative to the line of intersection of the mirrors of the kaleidoscope so that more light strikes the mirrors. However, this results in extreme defocusing of the array and thus has not been acceptable.

Another attempt has been to make the mirrors very long. Again, however, this has not proved acceptable since very little light is then available at the rear ends of the mirrors and the resulting array is quite small in size and of low overall brightness.

From the above, it is apparent that there exists a need for a new and improved telescopic kaleidoscope which is capable of producing a large and sharply focused image array having substantially uniform image intensity throughout the various portions of the array. The present invention solves this need in a novel and unique manner.

SUMMARY OF THE INVENTION

The present invention provides a new and improved telescopic kaleidoscope capable of displaying a symmetrical array of images of a distant object in such a manner that all segments of the array can be of substantially uniform brightness, yet be in sharp focus and of large size.

More specifically, the present invention provides a converging lens preferably oriented with its principal axis parallel with the reflecting surfaces of the mirrors, and placed adjacent the objective end of the mirrors. The converging lens forms the image of the objective lens of the telescopic kaleidoscope on the plane defined by the ends of the mirrors remote from the objective end, thereby to control the amount of light directed onto the mirrors.

A projecting lens can be positioned at the ends of the mirrors remote from the objective end so that the image array can be displayed on a suitable screen. Further, the kaleidoscope can be used as a camera or projector attachment and the lenses and mirrors can be made adjustable to vary the size, intensity and shape of the array

DETAILED DESCRIPTION

Figure 1:
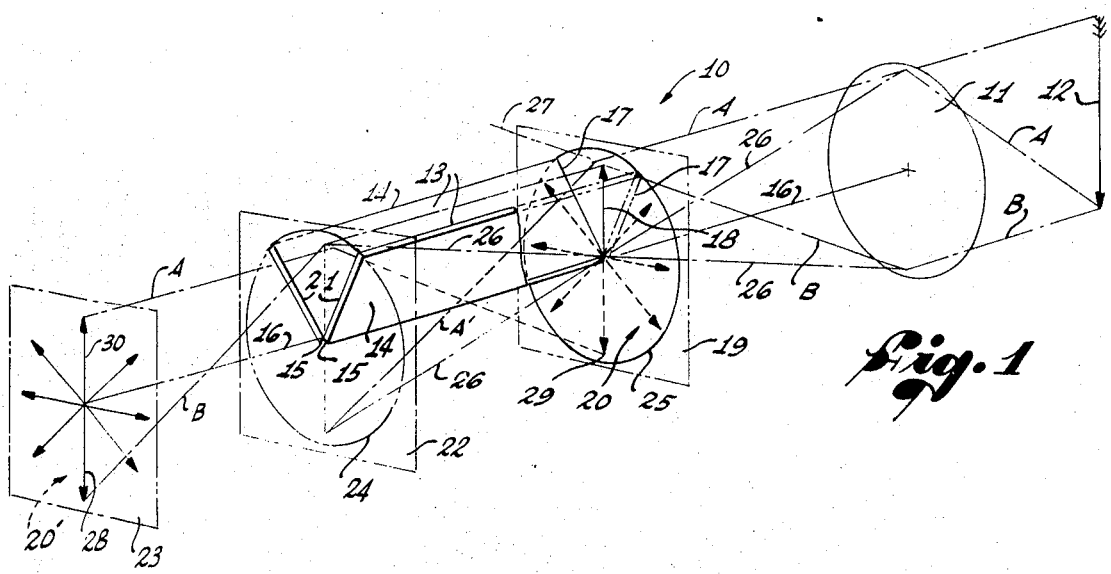
FIG. 1 is an optical diagram, in perspective, illustrating the principles of the telescopic kaleidoscope of the present invention.

As shown in the drawings, and more particularly in FIG. 1 thereof, the present invention is embodied in a new and improved telescopic kaleidoscope 10 having an objective lens 11 for focusing a distant object 12, herein an arrow, onto a set of reflecting surfaces 13 disposed in a kaleidoscopic configuration. In this instance, the reflecting surfaces 13 are a pair of rectangular mirrors 14 which are disposed in trough-shaped configuration 45° from each other, and which intersect along their bottom edges 15 in a straight line, herein indicated by the center line 16 and hereinafter referred to as the "mirror axis," so as to form a "V".

The objective lens 11 has its principal axis coaxial with the mirror axis 16 and is space forwardly of the front ends 17 of the mirrors 14 in such a manner that it focuses a real inverted image 18 of the distant object 12 in the plane 19 of the front ends of the mirrors, this plane being hereinafter referred to as the "image plane." The mirrors 14 reflect and re-reflect the real image 18 formed in the image plane 19 in such a manner that an image array 20 can be observed from the rear ends 21 of the mirrors, the observed image being a radially symmetrical array of images of the distant object 12. In this case, there are a total of eight observed images, seven virtual images illustrated by dashed lines, and the one real image 18, each virtual image having a size substantially equal to that of the single real image and emanating radially outwardly from a common point defined by the intersection of the image plane 19 and the mirror axis 16.

In order to see the virtual array 20, the observer must look into the space between the mirrors 14 from the rear ends 21, hereinafter referred to as the "exit window," and the observation must be made near the mirror axis 16 to see a satisfactorily symmetrical array, as is well known to those familiar with the basic principles of kaleidoscopes. The observation should also be made as close to the plane 22 defined by the rear ends 21 of the mirrors 14, hereinafter referred to as the "exit window plane," as possible to avoid loss of a portion of the virtual array 20 by vignetting.

As illustrated in FIG. 1, the virtual array 20 observed at the exit window can be displayed on a generally planar surface, herein a viewing screen 23, by placing a projecting lens 24 at the rear ends 21 of the mirrors 14 and focusing the image formed by this lens on the screen. In this instance, the projecting lens 24 is aligned with its principal axis along the mirror axis 16 so that a symmetrical real array of images 20' is produced on the screen 23 with the center of the real array 20' lying on the mirror axis extended.

In accordance with the present invention, the telescopic kaleidoscope 10 produces the real array 20' of the distant object 12 on the planar surface 23 in such a manner that all parts of the real array can be of substantially uniform light intensity and yet be of large size and in sharp focus. To accomplish this, the kaleidoscope 10 employs a converging lens 25, positioned between the objective lens 11 and the image plane 18, which forms the image of the objective lens centrally on the exit window plane 22, and acts to bring together the otherwise diverging rays from the image and to "beam" them onto the mirrors and toward the exit window 21.

With primary reference to FIG. 1, the converging lens 25 is herein aligned with its principal axis coaxial with the mirror axis 16 and is of a size sufficient to enclose that part of the real image 18 derived from the objective lens 11 that lies within the pie-shaped segment defined by the front ends 17 of the mirrors 14. To produce maximum light intensity in the real array 20' formed on the screen 23, the projecting lens 24 should be of a size such that lines drawn from the rim of the objective lens 11 crossing at the center of the converging lens 25 will fall within the rim of the projecting lens (see dashed lines 26 of FIGS. 1 and 2).

Without the converging lens 25, a portion of the light rays from the distant object 12 which are focused by the objective lens 11 to form the real image 18 in the image plane normally would not reach the reflecting surfaces 13 of the mirrors 14, but would diverge away from the mirrors as indicated by the phantom line 27 of FIG. 1. The converging lens 25 serves to redirect these rays toward the mirrors 14, thereby to increase the amount of light available for reflection and re-reflection to form the real array 20' viewed on the screen 23.

For example, taking the schematic ray A of FIG. 1, without the converging lens 25, this ray would travel without being reflected down the space between the mirrors 14. Upon reaching the projecting lens 24, the ray A would be bent to help form the tip of the inverted image 28 of the real array 20' on the screen 23. Similarly, without the converging lens 25, the schematic ray B from the distant object 12 would continue along its path after forming the real image 18 and would not reach lens 24 nor be incident on the reflecting surfaces 13 of the mirrors 14. Thus, ray B would not be available to help form the real array 20' displayed on the screen 23. With the converging lens 25 of the present invention, however, light rays which would otherwise be lost, are made useful by being directed toward the exit window plane 22.

Again looking at ray A of FIG. 1, rather than being allowed to travel straight down the space between the mirrors 14, this ray is directed by the converging lens 25 onto the mirror axis 16 between the front and the rear ends 17 and 21 of the mirrors and is multiply reflected back towards the exit window plane 22. Since the converging lens 25 focuses centrally on the exit window plane 22, that is, the center of the image field is at the point of intersection of the mirror axis 16 and the exit window plane, ray A is incident on the mirror axis midway between the front and rear ends 17 and 21 of the mirrors 14.

Thus, ray A is reflected from the mirror axis 16 as if it had originated at point 29 of the array 20 observed in the image plane 19. After reflection, ray A is focused by the projecting lens 24 onto the screen 23 to help form the tip of the upright image 30 of the real array 20'. In a generally similar manner, ray B of FIG. 1, rather than being lost, is focused by the converging lens 25 onto the exit window plane 22 and is thus made available to help form the inverted image 28 of the real array 20' on the screen 23.

It should be evident from FIG. 1 that the upright image 30 of the real array 20' formed on the screen 23 now receives more light rays from the real image 18 than it normally would. Therefore, a larger amount of light is now available to form the upright image 30 of the real array 20', thereby making that image considerably brighter than it would be in the absence of the converging lens 25. Hence, light is redirected from the otherwise brightest image 28 to the otherwise dimmest image 30 with the result that the totality of light is equally distributed among all the segments of the real array 20'.

On the other hand, the inverted image 28 of the real array 20' now receives light rays which would normally have been lost without the converging lens 25. Thus, the inverted image 28 remains bright by receiving relatively direct rays from the distant object 12. However, by using previously unavailable rays to form the inverted image 28, more rays are available to help form the reflected images, such as the upright image 30, of the real array 20'.

Figure 2:
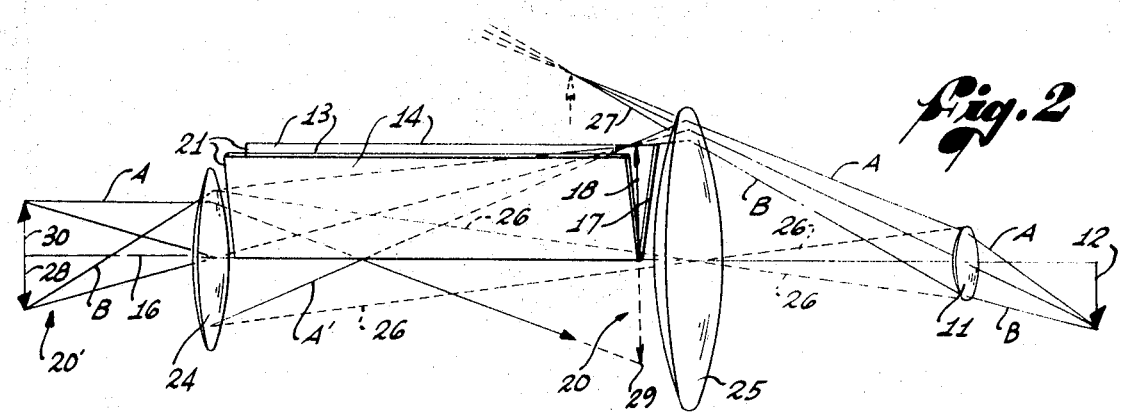
FIG. 2 is an additional optical diagram, in perspective, of the telescopic kaleidoscope of the present invention.

In the ideal case, the converging lens 25 should be placed in the image plane 19 so that the converging lens will not affect the real image 18 formed by the objective lens 11. However, as shown in FIG. 2, this is not possible since all real lenses are thick lenses. Therefore, the converging lens 25 must be positioned in front of the image plane 19, and be used to help the objective lens 11 bring to focus the real image 18 of the distant object 12 in the image plane.

Since the converging lens 25 helps the objective lens 11 to form the real image 18, the objective lens can be of a small size and longer focal length, as illustrated in FIG. 2. By using the smaller sized objective lens 11, the kaleidoscope 10 can be made smaller overall without loss of brightness in the real array 20' or sharpness of focus. Further, the objective lens 11 can be used to produce changes in the real array 20' by being moved relative to the converging lens 25.

If a lens is raised or lowered relative to an object, the image formed by the lens will follow the lens and will be raised or lowered. Further, to ensure that the image formed by a lens has maximum sharpness of focus, it is necessary that the plane upon which the lens focuses the image be perpendicular to the lens principal axis.

In FIGS. 1 and 2, the objective lens 11 and the converging lens 25 are each coaxial with the mirror axis 16. With this arrangement, the image plane 19 is perpendicular to the principal axis of the objective lens 11 and the exit window plane 22 is similarly perpendicular to the principal axis of the converging lens 25. As long as the principal axis of both the objective lens 11 and the converging lens 25 are maintained axially parallel with the mirror axis 16, the images produced in the image plane 19 and the exit window plane 22 will each be in uniform focus over the entire field.

In order that all images of the real array 20' have substantially equal brightness, the converging lens 25 must focus the objective lens 11 centrally on the exit window plane 22 with the center of focus being at the point of intersection between the mirror axis 16 and the exit window plane. If the center of focus of the converging lens 25 is lowered or raised from this point, more or less light will be directed onto the reflecting surfaces 13 of the mirrors 14. This effect will increase or decrease the brightness of portions of the real array 20'.

For example, if the converging lens 25 center point of focus is lowered so that no light travels down the space between the mirrors 14 without being reflected, the inverted image 28 would be extinguished. Similarly, if the converging lens 25 center point of focus is raised so that no light is incident on the mirrors 14, only the inverted image 28, the image formed of the real image 18, would be observed on the screen 23. By moving the center point of focus over the exit window plane 22, full control of the brightness of the individual images forming the real array 20' can be achieved.

Movement of the center point of focus of the converging lens 25 can be achieved by laterally shifting and by raising or lowering the converging lens relative to the mirror axis 14. The same result can also be obtained by varying the position of the objective lens 11 relative to the converging lens 25.

It is well known that if the object of a lens is raised or lowered relative to the principal axis of the lens, a real image formed by the lens will move in an opposite direction. That is, the real image will be observed to be lowered relative to the lens principal axis if the object is raised, and vice- versa.

The objective lens 11 is, in effect, the object of the converging lens 25 since the converging lens focuses the objective lens on the exit window plane 22. Therefore, if the objective lens 11 is raised relative to the converging lens 25, more light will be directed onto the mirrors 14 since this will produce a lowering of the image formed by the converging lens on the exit window plane 22. Similarly, a lowering of the objective lens 11 relative to the converging lens 25 will raise the image in the exit window plane 22, and thus reduce the amount of light directed onto the reflecting surfaces 13 of the mirrors 14.

Full control of the brightness of the real array 20' can be achieved by adjusting the relative positions of either the objective lens 11 or the converging lens 25, or both. By raising the objective lens 11 so that its optical axis is parallel to but not coincident with the mirror axis 16, the real image 18 of the distant object 12 will be raised in the image plane 19. This will have the effect of lowering the center point of the image of the objective lens 11 formed by the converging lens 25, relative to the mirror axis 16.

To return the center point of focus of the converging lens 25 to the point of intersection of the mirror axis 16 and the exit window plane 22, the converging lens may be also be raised so that it is axially parallel, but no longer coaxial, with the mirror axis. Therefore, full control of not only the brightness but also the pattern of the real array 20' can be achieved without loss of sharpness of focus by adjusting the relative positions of both the converging lens 25 and the objective lens 11.

In many applications, only the objective lens 11 will be made movable and both the converging lens 25 and the projecting lens 24 will be stationary relative to the mirror axis 16 and be coaxial therewith. In such applications, the converging lens 25 and the projecting lens 24 need not be full circular lenses. Since the real array 20' is formed on the screen 23 only by the use of the space between the mirrors 14, the only effective areas necessary for the projecting and converging lenses 24 and 25 are the pie-shaped segments lying between the reflecting surfaces of the mirrors at the rear and front ends 21 and 17, respectively. Therefore, the size of the kaleidoscope 10 can be further reduced by employing only the required lens segments.

This is also of importance limiting stray light which is not a part of the desired real array 20' from reaching the screen 23. Of course, if full circular lenses are used for the converging and projecting lenses 25 and 24, suitable masks over the unrequired segments can be used to prevent unwanted light from reaching the screen 23.

Figure 3:
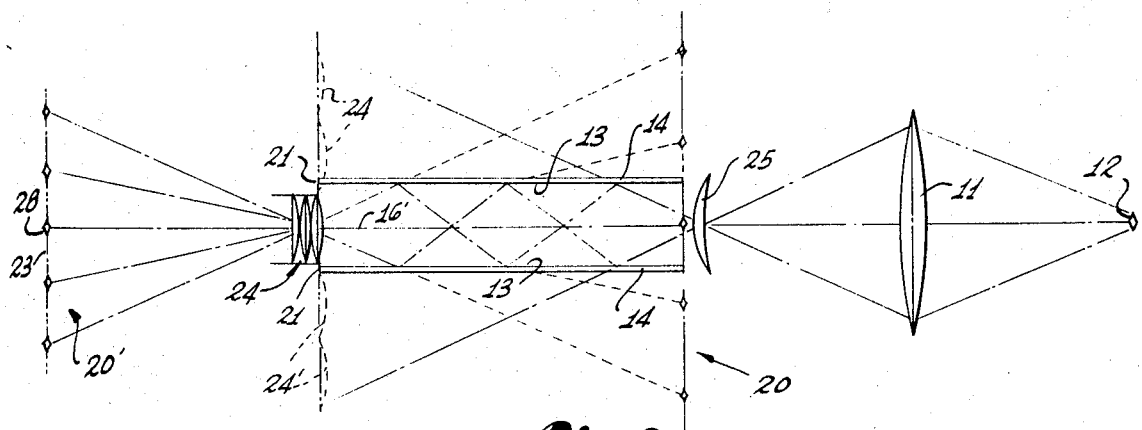
FIG. 3 is a longitudinal view through another form of the telescopic kaleidoscope of the present invention.

FIG. 3 illustrates another form of the telescopic kaleidoscope 10 wherein the mirrors 14 are disposed in parallel planes so that a straight band of real images 20' is displayed on the screen 23, as opposed to a radially symmetrical real array 20' as in FIGS. 1 and 2. In this instance, the "mirror axis" 16' is defined as a line parallel with the reflecting surfaces 13 and located midway between both mirrors 14 such that the perpendicular distance from the mirror axis to each mirror is substantially the same.

The converging lens 25 in the embodiment of FIG. 3, as in the embodiment of FIGS. 1 and 2, should form the image of the objective lens 11 centrally on the exit window plane defined by the rear ends 21 of the mirrors 14 to provide substantially equal illumination of the individual images forming the real band 20' displayed in the screen 23. However, there is an additional requirement that the converging lens 25 image the objective lens 11 on the exit window plane over as many individual images of the virtual band 20 as are required to fill the screen 23.

To provide maximum illumination of the individual images displayed on the screen 23, the converging lens 25 must direct more light rays from the distant object 12 onto the reflecting surfaces 13 of the mirrors 14. In the embodiment of FIG. 3, this is accomplished by expanding the area over which the objective lens 11 is focused by the converging lens 25 so that less light travels straight down the space between the mirrors 14 and more is directed onto the reflecting surfaces 13.

The virtual band of images 20 formed by the parallel mirrors 14 extends indefinitely when observed from the the exit window. However, in order to project the virtual band 20 onto the screen 23, the projecting lens 24 should project only those images from the virtual band 20 which will fill the desired space on the screen. Thus, for equal illumination, diagonal lines drawn from the rim of the objective lens 11 which cross as the center of the converging lens 25 should intersect the exit window plane so that the enclosed space includes not only the projecting lens 24 but also as many extensions of this lens as are required to fill the desired area of the screen 23, as shown by the phantom lenses 24'.

For example, in FIG. 3, the band of real images 20' includes a total of five images. Should however, it be desired that the band of real images 20' include only three images, the converging lens 25 should focus the objective lens 11 over only the first phantom lens extension 24' of the projecting lens 24 on each side of the actual projecting lens. This would then utilize all of the light available from the objective lens 11 for, and would provide substantially equal illumination of, the desired three image band 20' displayed on the screen 23.

Figure 4:
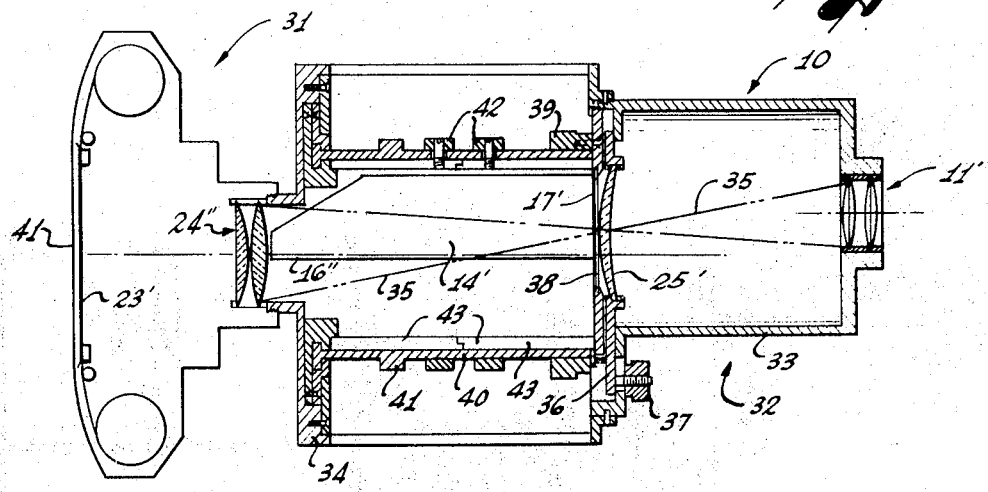
FIG. 4 is a longitudinal sectional side view of the telescopic kaleidoscope of the present invention used as an attachment for a camera.

As shown in FIG. 4, the kaleidoscope 10 can be used as an attachment for photographic camera 31, either for a still camera as illustrated, or a movie camera. In this instance, the kaleidoscope 10 is housed within a two-part case 32 having a front section 33 and a rear section 34 which is threaded to the front of the camera 31.

The camera lens, designated generally by reference numeral 24", preferably forms the projecting lens for the kaleidoscope 10 and focuses the image from the image plane onto a frame of film 23' at the rear of the camera 31. The objective lens, designated generally by reference numeral 11', is preferably a suitably corrected photographic objective lens, and should be of a small size so that diagonal lines drawn from the rim of the objective lens will fall within the rim of the projecting lens 24", as illustrated in FIG. 4 by the dashed lines 35.

In the manner discussed above, the objective lens 11' and the converging lens, herein designated 25', combine to form a real inverted image of a distant object (not shown in FIG. 4), in the image plane at the front ends 17' of the mirrors designated as 14'. The mirrors 14', in turn, reflect this image and the projecting lens 24" focuses the resultant array on the film 23'.

The objective lens 11' is preferably adjustable axially of the case 32 by any suitable means (not shown) so that objects at varying distances from the case can be brought into focus at the image plane. The projecting lens 24" can also be made adjustable so that its principal axis can be shifted relative to the mirror axis, herein designated 16", to shift the position of the array within the frame of film 23', preferably by means of a sliding mount (not shown) between kaleidoscope 10 and the camera 31.

The converging lens 25' is mounted to the rear of the front section 33 of the case 32 by a sliding mount 36. A manually operated knob 37 attached to the sliding mount 36 and extending through the case 32, enables the sliding mount to be shifted relative to the case so that the principal axis of the converging lens 25' can be raised or lowered relative to the mirror axis 16". This allows the operator of the camera 31 to select the relative brightness of the segments of the array focused on the film 23' so that some segments can be extinguished, or substantially uniform illumination of all segments can be obtained, as desired.

An iris diaphragm 38 is mounted behind the converging lens 25' to control the size of the array reaching the film 23'. In this instance, the diaphragm 38 is adjustable through a circumferential ring 39 carried by the rear section 34 of the case 32. Changing the size of the aperture of the diaphragm 38 increases or decreases the size of the real image formed by the objective lens 11' in the image plane and thereby increases or decreases the size of the array which is projected onto the film 23'.

Each of the two mirrors 14' is independently mounted in a cylindrical mount 40 carried by the rear section 34 of the case 32. An annular projection 41 extends around the cylindrical mount 40 and when turned, rotates the cylindrical mount so that the mirrors 14' rotate together about the mirror axis 16". Each mirror 14' is, in turn, individually adjustable by a pair of circumferential projections 42 extending through the wall of the cylindrical mount 40 from a pair of mirror holders 43 mounted for rotation relative to the cylindrical mount.

If it is desired that the angle between the mirrors 14' be changed, for example to alter the number of individual images forming the array, one or both of the mirrors can be rotated about the mirror axis 16'' by moving the mirror holders 43 through the projections 42. By increasing the angle between the mirrors 14', for example, from 45° to 60°, the number of images in the array will decrease from eight to six since the number of images forming the array is equal to the angle between the mirrors divided into 360°. Also, the mirrors 14' can be adjusted in such a manner that their reflecting surfaces will be mutually parallel with the mirror axis 16'' so that a straight band of images, as opposed to a symmetrical array, will be projected into the film 23', as discussed above in connection with FIG. 3.

Thus, the kaleidoscope 10 when used as an attachment for the camera 31 can be made adjustable to conform with the particular camera requirements, and the array captured by the film 23' can be fully controlled as to the brightness of the individual images forming the array and the size, and positioning of the array on the negative frame.

Figure 5:
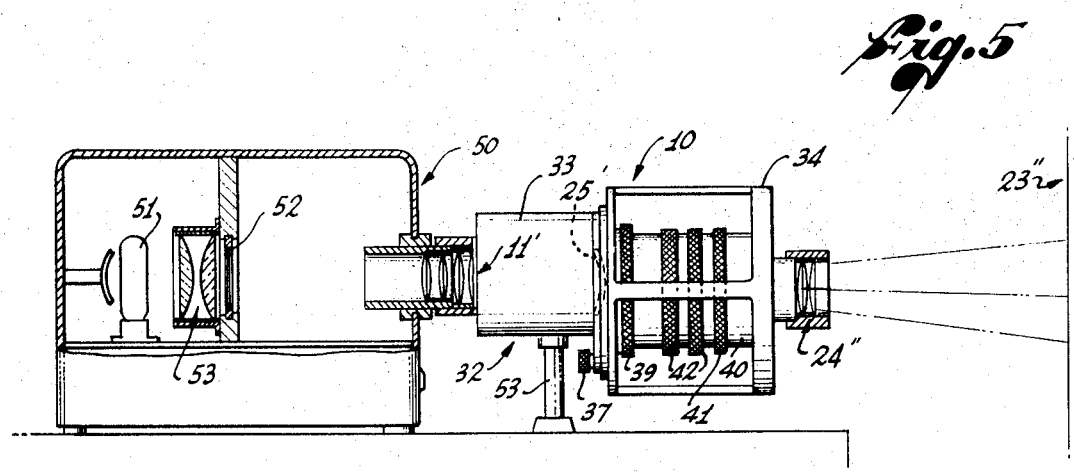
FIG. 5 is a side elevational view, partly in section, of the telescopic kaleidoscope of the present invention used as an attachment for a projector.

As illustrated in FIG. 5, the kaleidoscope 10 can also be used as an attachment for a projector 50. In this instance, the projector 50 has a lamp 51 for illuminating a photographic slide 52 through suitable condensing lenses 53. The kaleidoscope 10 is attached to the front end 54 of the projector 50 and projects an array of the slide 52 onto a projection screen 23''.

When used with the projector 50, the kaleidoscope 10 can take a form substantially like that discussed above with reference to its use as an attachment for the camera 31. With the projector 50, however, the slide 52 forms the object of the objective lens 11' and therefore the case 32 is attached to the projector at the forward end of the front section 33. A suitable stand 53 can be added to support the kaleidoscope 10 when attached to the projector 50, if necessary.

In use as an attachment for the projector 50, the kaleidoscope 10 operates as discussed above to reflect the real image of the slide 52 formed by the objective lens 11' in the image plane and focus the resultant array onto the projection screen 23''. The array can be changed by controlling both the position of the converging lens 25' and the spacing of the mirrors 14', and the size of the array displayed on the projection screen 23'' can also be controlled by adjusting the iris diaphragm ring 38 carried by the rear section of the case 32.

Alternatively, the slide 52 can be placed between the iris diaphragm 38 and the converging lens 25' rather than in the projector 50. This will enable the kaleidoscope 10 to project an array of the slide 52 onto the screen 23'' in a non-telescopic manner. Similarly, by using movable pieces of colored glass for the slide 52 and positioning them between the iris diaphragm 38 and the converging lens 25', the kaleidoscope 10 can be used to project a colored array onto the screen 23'' like that of a non-telescopic kaleidoscope, yet still be fully adjustable as hereinbefore described, and capable of achieving substantially equal illumination throughout the projected array.

From the above, it should be apparent that this invention provides a new and improved telescopic kaleidoscope 10 which enables an image array of a distant object to be projected onto a screen or other surface in such a manner that all parts of the array can be substantially equally illuminated and be of large size and in sharp focus throughout the array. Further, by virtue of the adjustability of the elements of the kaleidoscope 10, the size, shape and brightness of the array can be controlled as desired, thus enabling the kaleidoscope to be used with photographic cameras and projectors to produce effects never before possible.

Throughout the foregoing discussion, the mirrors of the telescopic kaleidoscope have been shown and described in either a V-shaped configuration (FIGS. 1,2,4 and 5) or in a parallel configuration (FIG. 3). It should be apparent, however, that many different mirror configurations are possible and that the particular mirror configuration used constitutes no part of this invention, except insofar as one or more mirrors are required to be arranged in a kaleidoscope configuration to produce a kaleidoscopic array.

For example, the telescopic kaleidoscope of this invention may employ three mirrors arranged in a triangular pattern or four mirrors arranged in a box-shaped pattern. Regardless of the mirror arrangement, or the number of mirrors, it will be appreciated that the principles underlying operation of the invention, as heretofore discussed, remain the same.

It also will be apparent that while particular forms of the invention have been illustrated and described, various modifications therein can be made without departing from the spirit and scope of the invention. Accordingly, it is not intended that the invention be limited, except as by the appended claims.

We claim:

1. In a kaleidoscope of the type having an objective lens spaced forwardly from the ends of a set of mirrors having reflecting inner surfaces disposed in a kaleidoscopic configuration, and an opening adjacent the rear end of said mirrors, the improvement comprising:
   a converging lens adjacent the forward end of said mirrors whereby the image of said objective lens is focused (centrally) on said rear opening.

2. The improvement as defined in claim 1 wherein:
   a projecting lens is positioned adjacent said rear opening, the principal axis of said projecting lens being coaxial with the line of intersection of said mirrors;
   and the principal axis of said converging lens is parallel with the principal axis of said projecting lens.

3. The improvement as defined in claim 2 wherein the principal axis of said objective lens is parallel with the principal axis of said projecting lens.

4. The improvement as defined in claim 1 wherein:
   a projecting lens is positioned adjacent said rear opening, the principal axis of said projecting lens being coaxial with the line of intersection of said mirrors;
   and the principal axes of said objective lens and said converging lens are each coaxial with the principal axis of said projecting lens.

5. A kaleidoscope comprising:
   a set of reflecting surfaces disposed in a kaleidoscopic configuration and having front and rear ends defining front and rear planes, respectively, said planes being orthogonal to said reflecting surfaces;
   an objective lens spaced forwardly of said front ends and focusing an image of a distant object on said front plane;
   and a converging lens adjacent said front ends, said converging lens forming the image of said objective lens on said rear plane whereby the amount of light directed onto said reflecting surfaces from said objective lens can be controlled by said converging lens.

6. A kaleidoscope as defined in claim 5 including:
   a generally planar surface spaced rearwardly from said rear ends;
   and a projection lens adjacent said rear ends, said projection lens focusing the image of said converging lens on said planar surface.

7. A kaleidoscope as defined in claim 6 wherein said planar surface is a projection screen.

8. A kaleidoscope as defined in claim 6 wherein said planar surface is a frame of photographic film.

9. A kaleidoscope as defined in claim 5 wherein the principal axes of said objective lens and said converging lens are each parallel with said reflecting surface and with each other.

10. A kaleidoscope as defined in claim 9 wherein said converging lens is adjustable in such a manner that its principal axis can be shifted relative to said reflecting surfaces of said mirrors.

11. A kaleidoscope as defined in claim 10 wherein said objective lens is adjustable in such a manner that its principal axis can be shifted relative to said reflecting surfaces of said mirrors.

12. A kaleidoscope as defined in claim 9 including a projecting lens adjacent said rear ends, the principal axis of said projecting lens being parallel with said reflecting surfaces of said mirrors.

13. A kaleidoscope attachment for use with projectors, cameras and the like comprising:

an elongated housing having a projection end and an objective end;

a set of elongated reflecting surfaces mounted in said housing between said projection end and said objective end, said reflecting surfaces having front ends defining a front plane and rear ends defining a rear plane, and said reflecting surfaces being disposed in a kaleidoscopic configuration;

an objective lens mounted in said objective end of said housing, said objective lens being spaced forwardly of said front ends of said reflecting surfaces in such a manner that a real image of a distant object can be focused on said front plane;

and a converging lens mounted in said housing adjacent said front ends of said reflecting surfaces, said converging lens forming the image of said objective lens on said rear plane.

14. A kaleidoscope attachment as defined in claim 13 including:

a projecting lens mounted adjacent said projecting end of said housing, the principal axis of said projecting lens being parallel with said reflecting surfaces.

15. A kaleidoscope attachment as defined in claim 14 wherein:

the principal axis of said objective lens is parallel with said reflecting surfaces;

and the principal axis of said converging lens is parallel with said reflecting surfaces.

16. A kaleidoscope attachment as defined in claim 13 wherein:

said reflecting surfaces are adjustable relative to each other;

and said objective lens is adjustable whereby the spacing between said objective lens and said front ends of said reflecting surfaces can be changed.

17. A kaleidoscope attached as defined in claim 16 wherein:

the principal axis of said objective lens is parallel with said reflecting surfaces;

and the principal axis of said converging lens is parallel with said reflecting surfaces, said converging lens being adjustable in such a manner that the center point of focus of the image of said objective lens on said rear plane can be moved.

18. A kaleidoscope attachment for a photographic camera, comprising:

an elongated housing having a projection end and an objective end, said projection end being attachable to the camera;

a set of elongated reflecting surfaces mounted in said housing between said projection end and said objective end, said reflecting surfaces having front ends defining a front plane and rear ends defining a rear plane, and said reflecting surfaces being disposed in a kaleidoscopic configuration;

an objective lens mounted in said objective end of said housing, said objective lens being spaced forwardly of said front ends of said reflecting surfaces in such a manner that a real image of a distant object can be focused on aid front plane;

and a converging lens mounted in said housing adjacent said front ends of said reflecting surfaces, said converging lens forming the image of said objective lens on said rear plane.

19. A kaleidoscope attachment as defined in claim 18 including:

a projecting lens mounted adjacent said projecting end of said housing, the principal axis of said projecting lens being parallel with said reflecting surfaces.

20. A kaleidoscope attachment as defined in claim 18 wherein said reflecting surfaces are adjustable relative to each other;

and said objective lens is adjustable whereby the spacing between said objective lens and said front ends of said reflecting surfaces can be changed.

21. A kaleidoscope attachment as defined in claim 20 wherein:

the principal axis of said objective lens is parallel with said reflecting surfaces;

and the principal axis of said converging lens is parallel with said reflecting surfaces, said converging lens being adjustable in such a manner that the center point of focus of the image of said objective lens on said rear plane can be moved.

22. A kaleidoscope attachment for a film projector comprising:

an elongated housing having a projection end and an objective end, said objective end being attached to the projector;

a pair of elongated reflecting surfaces mounted in said housing between said projecting end and said objective end, said reflecting surfaces having front ends defining a front plane and rear ends defining a rear plane, and said reflecting surfaces being disposed in a kaleidoscopic configuration;

an objective lens mounted in said objective end of said housing, said objective lens being spaced forwardly of said front ends of said reflecting surfaces in such a manner that a real image of a distant object can be focused on said front plane;

and a converging lens mounted in said housing adjacent said front ends of said reflecting surfaces, said converging lens forming the image of said objective lens on said rear plane.

23. A kaleidoscope attachment as defined in claim 22 including:

a projecting lens mounted adjacent said projecting end of said housing, the principal axis of said projecting lens being parallel with said reflecting surfaces.

24. A kaleidoscope attachment as defined in claim 22 wherein said reflecting surfaces are adjustable relative to each other;

and said objective lens is adjustable whereby the spacing between said objective lens and said front ends of said reflecting surfaces can be changed.

* * * * *

PO-1050
(5/69)

UNITED STATES PATENT OFFICE
CERTIFICATE OF CORRECTION

Patent No. 3,661,439  Dated May 9, 1972

Inventor(s) JOHN L. BURNSIDE, III; HENRY HAYS

It is certified that error appears in the above-identified patent and that said Letters Patent are hereby corrected as shown below:

ABSTRACT, line 5, "kaleidoscope" should be --kaleidoscopic--.

Column 2, line 34, "space" should be --spaced--.

Column 3, line 18, after "plane" insert --19--.

Column 5, line 32, after "importance" insert --for--.

Column 7, line 43, after "section" insert --34--; line 74, "kaleidoscope" should be --kaleidoscopic--.

Column 10, line 1, "aid" should be --said--; line 32, "projecting" should be --projection--.

Signed and sealed this 1st day of August 1972.

(SEAL)
Attest:

EDWARD M. FLETCHER, JR.
Attesting Officer

ROBERT GOTTSCHALK
Commissioner of Patents